July 28, 1925.
R. RYCHIGER ET AL
1,547,612
APPARATUS FOR PRODUCING EDGED WORK PIECES
Filed Dec. 9, 1922    4 Sheets-Sheet 4
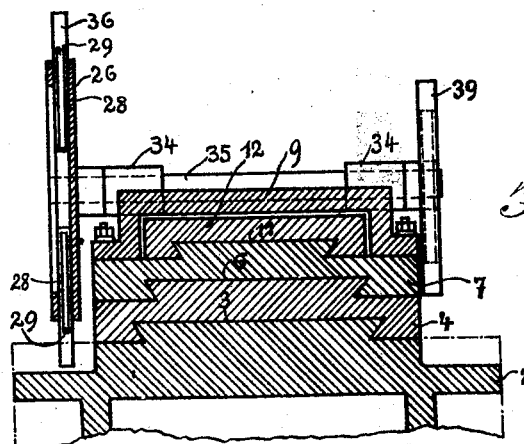
Fig. 4.
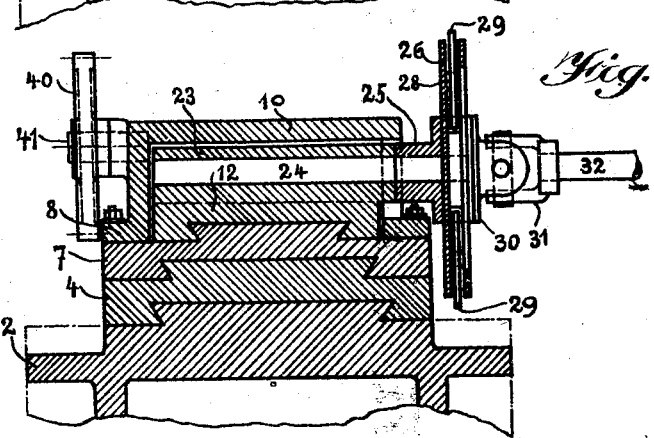
Fig. 5.
Fig. 6.
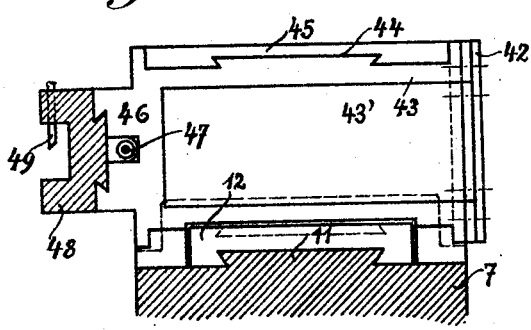
Fig. 7.
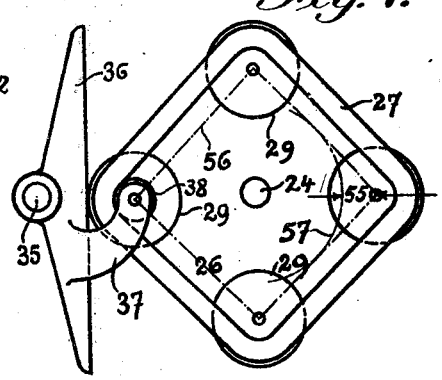
Inventors:
Rudolf Rychiger
and Ernst Klipfer
By Arthur ___
atty Patented July 28, 1925.

1,547,612

UNITED STATES PATENT OFFICE.

RUDOLF RYCHIGER AND ERNST KÜPFER, OF STEFFISBURG, SWITZERLAND.

APPARATUS FOR PRODUCING EDGED WORK PIECES.

Application filed December 9, 1922. Serial No. 605,834.

*To all whom it may concern:*

Be it known that we, RUDOLF RYCHIGER and ERNST KÜPFER, both Swiss citizens, residing at Steffisburg, Canton Bern, Switzerland, have invented certain new and useful Improvements in Apparatus for Producing Edged Work Pieces (for which we have filed application in Germany, 10th January, 1922; Switzerland, 25th April, 1922; and France, 11th April, 1922; Italy, 28th September, 1922), of which the following is a specification.

Our invention relates to apparatus for producing edged work pieces by turning, boring, or like working, of the kind in which a rotating pattern operates a copying lever which reciprocates a tool lever arm mounted with the copying lever upon the same tool slide. The tool lever arm is also simultaneously oscillated by the copying lever.

The novelty of our invention consists in the fact that the pattern is mounted upon a pattern slide movable crosswise and with the shaft of the copying lever which receives the tool slide is connected in such a way that both slides can execute corresponding movements to and fro but in opposite direction, whilst the shaft of the copying lever turns simultaneously the tool-holder which is mounted on the same slide.

Figure 1:
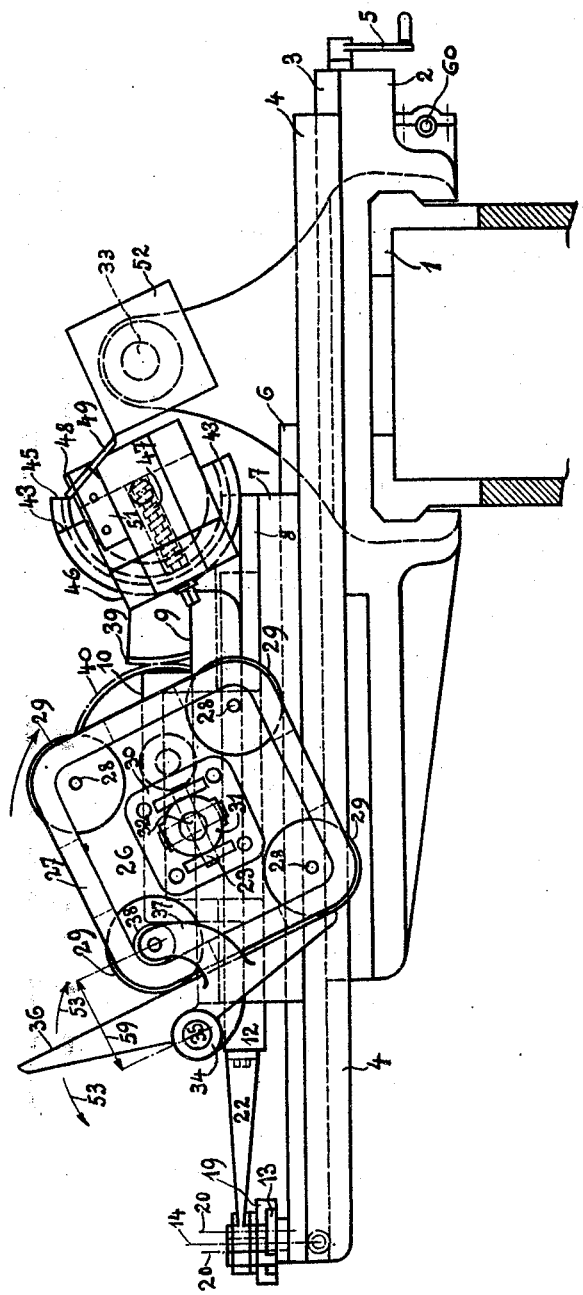
Figure 2:
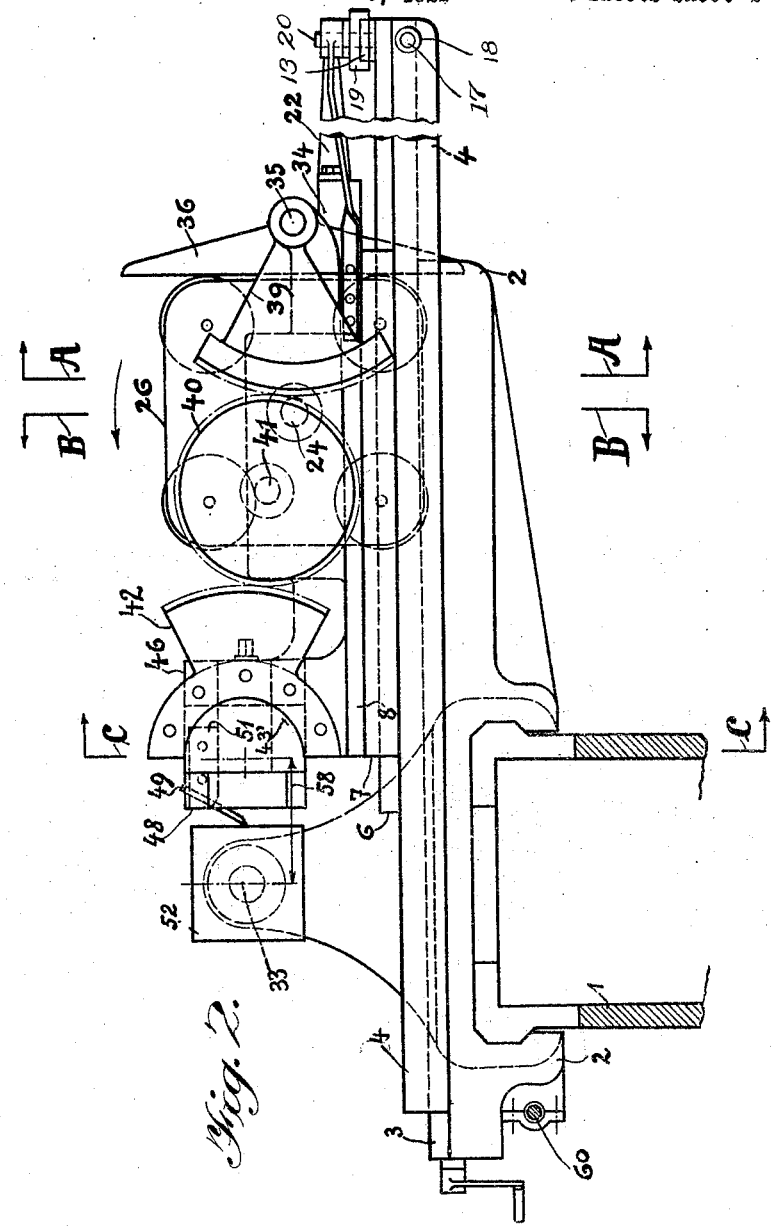
Figure 3:
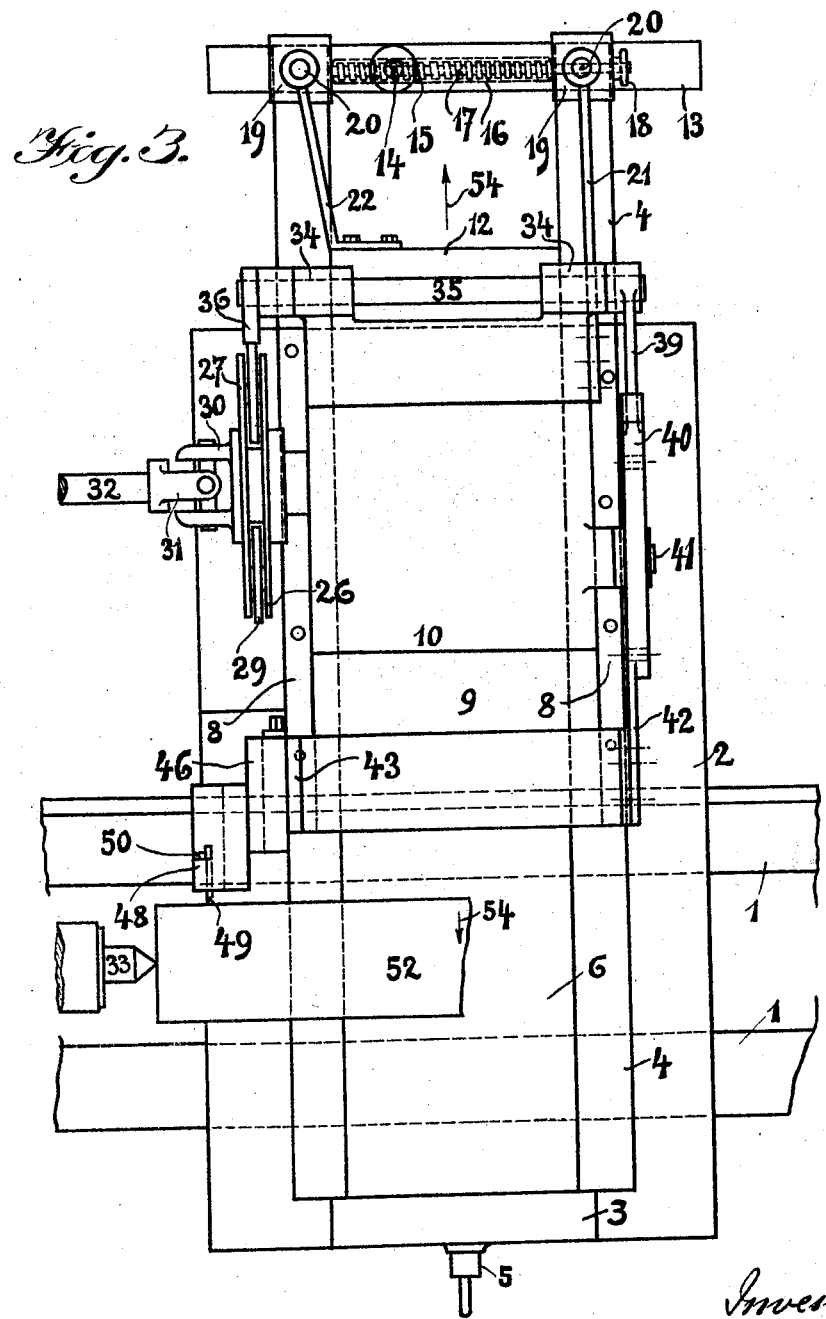

The accompanying drawings show by way of example one construction embodying the features of the invention. Fig. 1 is a front elevation of the apparatus, Fig. 2 is a rear elevation of the apparatus, Fig. 3 is a plan corresponding to Fig. 2, Figs. 4, 5 and 6 are sections respectively on lines A—A, B—B, and C—C of Fig. 2, and Fig. 7 is a detail view.

The lathe frame member 1 carries a longitudinal slide 2, which is provided with a transverse guide rail 3 carrying a cross slide 4. The cross slide 4 may be moved by means of a handle 5 operating a screw spindle (not shown in the drawing) engaging a corresponding nut upon the slide. Upon a rail 6 of the cross slide 4 is guided a reciprocating tool slide 7. To the slide 7 is screwed a plate 8 which is formed with an elevated portion 9 and a saddle 10. The tool slide 7 is also provided with a rail 11 upon which is guided a reciprocating pattern slide 12. This pattern slide 12 is operatively connected with the tool slide 7 by a two-armed lever 13. The lever 13 is mounted to oscillate upon a pivot 14 carried by a slide member 15 which is guided within a slot 16 of the cross slide 4. The fulcrum pin 14 may be adjusted by means of a screw spindle 17 which passes through a threaded bore of the slide member 15 and may be operated by means of a hand wheel 18. Each arm of the lever 13 carries an adjustable slide member 19. One of these slide members 19 is connected through a bolt 20 and a bracket 21 with the plate 8. The other slide member 19 is connected through a bolt 20 and a bracket 22 to the pattern slide 12. In a bearing 23 integral with the pattern slide 12 is mounted a rotary shaft 24. Upon one end of this shaft is mounted a square plate 26 by means of a hub 25. To this plate are secured a frame 27 and four studs 28 each of which carries a roller 29 projecting beyond the edge of the plate 28. The corners of the plate 26 and those of the frame 27 are rounded off by circular arcs the centres of which correspond to the centres of the studs 28. The plate 26 together with the frame 27 and the rollers 29 form the pattern. In the middle part of the pattern is mounted a universal joint member 30 which is in engagement with another universal latter 31. The joint member 31 is fixed upon a shaft 32 which is driven (by means not shown in the drawings) from the main lathe spindle 33.

Upon the rear side of the plate 8 are secured two bearings 34 which carry a shaft 35. Upon this shaft 35 is fixed a copying lever 36 which is provided with an arm 37 taking over the frame 27 and carrying a roller 38 bearing against the inner periphery of the frame 27. By this means the copying lever 36 is positively guided along the pattern so that it bears against two rollers 29 and is adapted to tilt into the position shown in Fig. 7 over the corner of the pattern. On the other end of the shaft 35 is fixedly mounted a toothed segment 39. This segment engages a toothed wheel 40 which is rotatably mounted upon a pivot bolt 41 fixed to the plate 8, and engages another toothed segment 42. The toothed segment 42 is fixed to a rotary slide 43. The slide 43 is provided with a guide plate 46 upon which is slidably mounted the tool holder 48. The tool holder 48 may be operated by means of a spindle 47, and carries a steel cutter 49, the latter being mounted in a groove 50 of the holder and held by means of a clamping plate 51. The steel cutter 49 acts upon the work piece 52 which rotates with the main spindle 33 of the lathe. The work piece is held between the lathe centres, one of these centres being shown in Fig. 3.

The operation is as follows:

The pattern is driven from the main spindle 33 and oscillates the copying lever 36 in the direction of the arrows 53. (Fig. 1.) It also reciprocates at the same time the pattern slide 12 which is mounted upon the tool slide 7 in the direction of the arrows 54 (Fig. 3), the two slides shifting against each other by the distance 55 (see Fig. 7). The distance of this crosswise shifting corresponds to the distance resulting from the crosswise shifting of the copying lever 36 which is moved to and fro by the circulating pattern (27) from the circumference of a circle (57) marked in the pattern square (56) as far as the fulcrum of a roller (29). In the embodiment shown the shifting of the pattern slide (12) reaches to a length of 1/3 of the distance 55, while the shifting of the tool slide reaches to 2/3 of the distance 55. This proportion depends on the proportion of the arms of the lever (13) of varying length, the shorter arm shoving a proportion of 1:3 to the total length of the two-armed lever whilst the proportion for the longer arm is 2:3. By the shifting of the fulcrum pin 14 the longitudinal proportion of the two arms of the lever being changed, the length of run of the crosswise shifting of the slides 7 and 12 is also changed in the same proportion. Also the length of the arm of the tool lever, that is the distance from the axle of the revolving slide 43 as far as the cutting edge of the lathe tool 49, in the present case 2/3 of the distance 59 from the fulcrum of the copying lever to the fulcrum of the roller 29.

By this adjustment of the tool-holder and the lever-arm 13, causing the cross-wise slide movement, the length of the side of the finished piece of work (52) is in the proportion of from 2:3 to the length of the side of the pattern frame (56).

For producing an edged work piece, the cross slide 4 is first moved until the distance from the axis of rotation of the rotary slide 43, bears the same relation to the distance from the centre of rotation of the pattern to the axis of rotation of the copying lever 36, as the length of the side of the pattern square 56 to the length of the side of the work piece to be produced, i. e. in the present case in the proportion of 2:3. The tool holder 48 is then gradually advanced by means of a spindle 47 until the work piece has been worked to the required size.

A movable connection (not shown in the the drawing) between the shaft 32 and the lathe spindle 33 enables the longitudinal slide 2 to be advanced during the working operation by means of the spindle 60 along the frame 1.

It may be observed that the pattern may have any other form, the square form being given only by way of example.

While we have described the embodiments of our invention in great detail, we desire it to be understood that we do not desire to be limited to the exact details shown and described, as many changes may be made therein without departing from the spirit of our invention.

We claim:—

1. In an apparatus for forming, a reciprocating tool slide, a movable tool-holder carried by the said tool slide, a reciprocating pattern slide mounted on the said tool slide, an operative connection between the said tool slide and the said pattern slide adapted to impart to the said two slides a forward and backward movement in opposite direction to each other, a rotatable pattern carried by the said pattern slide, means for rotating the said pattern, a shaft journalled in said tool slide, and a copying lever mounted on the said shaft being guided on the said rotatable pattern so as to impart an oscillating movement to said tool-holder corresponding to the said pattern.

2. An apparatus as specified in claim 1, comprising also a rotary slide for the said tool-holder, a toothed segment fixed to the said rotary slide, a toothed wheel in engagement with the said toothed segment, and another toothed segment secured to the shaft of the said copying lever.

3. An apparatus as specified in claim 1, in which the said operative connection between the said tool-slide and the said pattern-slide comprises a slide member, a pivot pin carried thereby, and a two-armed lever mounted on the said pivot pin, one lever arm being connected to the said tool-slide and the other to the said pattern-slide.

4. An apparatus as specified in claim 1, in which the said operative connection between the said tool-slide and the said pattern-slide comprises a slide member, a pivot pin carried thereby, and a two-armed lever mounted on the said pivot pin, one lever arm being connected to the said tool-slide and the other to the said pattern-slide, a screw-spindle passing through a threaded bore in said slide member for adjusting said pivot pin, and a means for operating said screw-spindle.

5. An apparatus as specified in claim 1, in which the said operative connection between the said tool-slide and the said pattern-slide comprises a slide-member, a pivot pin carried thereby, a two-armed lever mounted on the said pivot pin, an adjustable slide member on each lever arm, and a connecting means between the said adjustable slide-members and the said tool-slide and pattern-slide respectively.

In testimony whereof we have hereunto set our hand in the presence of two witnesses.

RUDOLF RYCHIGER.
ERNST KÜPFER.

Witnesses:
A. BAILLEUX,
R. HEINGARTNER.